US011143029B2

(12) United States Patent
Tokunaga et al.

(10) Patent No.: US 11,143,029 B2
(45) Date of Patent: Oct. 12, 2021

(54) SEALING MEMBER (71) Applicant: EAGLE INDUSTRY CO., LTD., Tokyo (JP)

(72) Inventors: Yuichiro Tokunaga, Tokyo (JP); Masatoshi Itadani, Tokyo (JP); Akira Yoshino, Tokyo (JP)

(73) Assignee: EAGLE INDUSTRY CO., LTD, Tokyo (JP)

( * ) Notice: Subject to any disclaimer, the term of this patent is extended or adjusted under 35 U.S.C. 154(b) by 198 days.

(21) Appl. No.: 16/462,904

(22) PCT Filed: Nov. 17, 2017

(86) PCT No.: PCT/JP2017/041521
§ 371 (c)(1),
(2) Date: May 21, 2019

(87) PCT Pub. No.: WO2018/097064
PCT Pub. Date: May 31, 2018

(65) Prior Publication Data
US 2020/0063560 A1 Feb. 27, 2020

(30) Foreign Application Priority Data

Nov. 22, 2016 (JP) .............................. JP2016-226379

(51) Int. Cl.
*F01C 19/08* (2006.01)
*F01C 21/04* (2006.01)
(Continued)

(52) U.S. Cl.
CPC .............. *F01C 19/08* (2013.01); *F01C 21/04* (2013.01); *F01M 1/06* (2013.01); *F16J 15/16* (2013.01); *F05D 2240/55* (2013.01)

(58) Field of Classification Search
CPC . F01C 19/08; F01C 21/04; F01C 1/22; F01M 1/06; F16J 15/16; F05D 2240/55; F02B 53/00; F02B 55/02
(Continued)

(56) References Cited

U.S. PATENT DOCUMENTS 3,176,910 A * 4/1965 Bentele ................... F01C 19/08
418/61.2
3,697,202 A * 10/1972 Reinhart ................. F01C 19/10
418/142
(Continued)

FOREIGN PATENT DOCUMENTS

| JP | S5199714 A | 9/1976 |
|----|------------|--------|
| JP | S5536903 U | 3/1980 |
| JP | 2013072425 A | 4/2013 |

OTHER PUBLICATIONS

International Search Report (ISR) dated Jan. 23, 2018, issued for International application No. PCT/JP2017/041521. (4 pages).

Primary Examiner — J. Todd Newton
(74) Attorney, Agent, or Firm — Law Office of Katsuhiro Arai (57) ABSTRACT In an exemplary embodiment, a sealing member 11 is provided between a rotating body 5 rotating while whirling within an accommodating chamber 4 partitioned by a housing and a side wall 3 of the accommodating chamber 4 and has a sliding surface S sliding on the side wall 3, and the sliding surface S includes a first lubrication mechanism 21 arranged on one side in the longitudinal direction, and a second lubrication mechanism 22 arranged on the other side in the longitudinal direction and exhibiting lubrication performance in a sliding direction different from that of the first lubrication mechanism 21, thereby improving sealing performance of the sealing member.

20 Claims, 6 Drawing Sheets (51) Int. Cl.
*F01M 1/06* (2006.01)
*F16J 15/16* (2006.01)

(58) Field of Classification Search
USPC ......... 418/140, 61.2, 83, 113, 142; 277/357, 277/591
See application file for complete search history.

(56) References Cited

U.S. PATENT DOCUMENTS

| | | | | |
|---|---|---|---|---|
| 3,827,701 | A * | 8/1974 | Sakamaki | F01C 19/08 277/357 |
| 3,851,999 | A * | 12/1974 | Bibbens | F01C 19/08 418/142 |
| 3,885,799 | A * | 5/1975 | Bibbens | F01C 19/08 277/357 |
| 3,988,081 | A * | 10/1976 | Goloff | F01C 19/08 418/142 |
| 3,999,906 | A * | 12/1976 | Goloff | F01C 19/08 418/142 |

* cited by examiner

(a) VIEW ON ARROW A-A

(b) VIEW ON ARROW B-B (c) VIEW ON ARROW C-C

(d) VIEW ON ARROW D-D

(a) VIEW ON ARROW E-E

(b) VIEW ON ARROW F-F (c) VIEW ON ARROW G-G (d) VIEW ON ARROW H-H

SEALING MEMBER

CROSS-REFERENCE TO RELATED APPLICATIONS

This application is the U.S. National Phase under 35 U.S.C. § 371 of International Application PCT/JP2017/041521, filed Nov. 17, 2017, which claims priority to Japanese Patent Application No. 2016-226379, filed Nov. 22, 2016. The International Application was published under PCT Article 21(2) in a language other than English.

TECHNICAL FIELD

The present invention relates to a sealing member for sealing a side surface of a rotating body rotating while whirling, for example, such as a rotor for a rotary engine, a rotary compressor, or the like.

BACKGROUND ART

In a rotary engine, an approximately triangular rotor is accommodated in a rotor accommodating chamber consisting of a rotor housing and a side housing, three operation chambers are formed between the triangular rotor and the rotor housing, and the rotor is supported rotatably with respect to an eccentric wheel of an eccentric shaft. Moreover, the rotor is provided with apex seals attached to respective apexes of the triangular rotor for keeping air tightness of the three operation chambers, side seals attached to respective sides of side surfaces of the triangular rotor for keeping air tightness between the rotor and the side housing, corner seals attached to connecting points of the apex seals and the side seals for keeping air tightness of the operation chambers and the side housing, and an oil seal provided between an inner circumferential part of the side surfaces of the rotor and the side housing for preventing oil used for cooling the rotor from leaking to the operation chambers. These various seals are sealing between the rotor and the both rotor housing and side housing while sliding therebetween (for example, see Patent Document 1).

CITATION LIST

Patent Document

Patent Document 1: JP 2013-72425 A (pp. 4-5, FIGS. 1-6)

SUMMARY OF THE INVENTION

Problem to be Solved by the Invention

However, among the various seals of Patent Document 1, the side seal has a large contact area because of being attached to the side surfaces of the respective sides of the triangular rotor along almost overall length and further has large sliding velocity because of being attached to an outer circumferential side of the rotor, and therefore sliding loss increases. Moreover, even if a lubrication groove is provided in the sliding surface of the side seal in order to reduce sliding loss of the side seal, the rotor rotating while whirling could not take fluid in the lubrication groove because its sliding direction is changed during one revolution, and sliding loss could not be reduced. Since the side seal whose contact area and sliding velocity are thus large causes not only large sliding loss, but also significant abrasion accompanied with sliding, a seal function of the side seal is lowered, and there was a problem in that engine efficiency is decreased due to pressure drop at the time of compression of the rotor, an increase of blow-by gas, and the like.

An object of the present invention is to provide a sealing member whose sealing performance is improved by reducing sliding loss of a side housing and a side seal which is provided to a side surface of a rotating body, such as a rotor for a rotary engine or a rotary compressor, rotating while whirling within a housing.

Means for Solving Problem

In order to solve the problem, a sealing member according to a first aspect of the present invention is a sealing member provided between a rotating body rotating while whirling within an accommodating chamber partitioned by a housing and a side wall of the housing and having a sliding surface sliding on the side wall, and the sealing member is characterized in that the sliding surface includes a first lubrication mechanism arranged on one side in a longitudinal direction, and a second lubrication mechanism arranged on the other side in the longitudinal direction and exhibiting lubrication performance in a sliding direction different from that of the first lubrication mechanism.

According to the first aspect, even if the sliding direction of the sealing member and the side wall is changed during one revolution of the whirling rotating body, the first lubrication mechanism and the second lubrication mechanism exhibit lubrication performance in different directions respectively, and therefore sliding loss of the sealing member and the side wall can be reduced, and sealing performance of the sealing member can be improved by reducing abrasion of the sealing member and the side wall.

The sealing member according to a second aspect of the present invention is characterized in that the first lubrication mechanism and the second lubrication mechanism have a closing wall part closing at least one side and an opening part opening the other side, and in that the first lubrication mechanism includes a first opening part facing an outer side in a radial direction of the rotating body and the second lubrication mechanism includes a second opening part facing an inner side in the radial direction of the rotating body.

According to the second aspect, even if the sliding direction of the sealing member and the side wall is changed during one revolution of the rotating body, the fluid efficiently flows into the first lubrication mechanism and the second lubrication mechanism from the first opening part and the second opening part which are opened to the directions different from each other, the flowed fluid is blocked by the closing wall part and its pressure is raised, the fluid with pressure raised is supplied to the sliding surface, and the sliding surface is lubricated. Thereby, sliding loss of the sealing member and the side wall can be reduced, and sealing performance of the sealing member can be improved by reducing abrasion of the sealing member and the side wall.

The sealing member according to a third aspect of the present invention is characterized in that the first lubrication mechanism and the second lubrication mechanism have a closing wall part closing at least one side and an opening part opening the other side, and in that the first lubrication mechanism includes a first opening part facing the inner side in the radial direction of the rotating body and the second lubrication mechanism includes a second opening part facing the outer side in the radial direction of the rotating body.

According to the third aspect, the fluid scraped by the sealing member is supplied by rotation of the rotating body to the first lubrication mechanism and the second lubrication mechanism, and the first lubrication mechanism and the second lubrication mechanism can keep the sliding surface of the sealing member in a lubricated condition.

The sealing member according to a fourth aspect of the present invention is characterized in that the first lubrication mechanism and the second lubrication mechanism include the closing wall part on a delay side in a rotation direction of the rotating body than the respective opening parts.

According to the fourth aspect, the first lubrication mechanism and the second lubrication mechanism can efficiently take in the fluid.

The sealing member according to a fifth aspect of the present invention is characterized in that the sliding surface includes a plurality of the first lubrication mechanisms and a plurality of the second lubrication mechanisms.

According to the fifth aspect, even if a length of the sliding surface is long, the plurality of first lubrication mechanisms and the plurality of second lubrication mechanisms whose lubrication performances are different from each other depending on a position of the sliding surface are arranged, and sliding loss is reduced, thereby sealing performance can be improved.

The sealing member according to a sixth aspect of the present invention is characterized in that the first lubrication mechanism and the second lubrication mechanism are formed of a diamond shaped recess.

According to the sixth aspect, by the lubrication mechanism having the diamond shaped recess, the first lubrication mechanism and the second lubrication mechanism can be easily configured.

DESCRIPTION OF EMBODIMENTS

Hereinafter with reference to the drawings, modes for carrying out the present invention will be described illustratively based on embodiments. However, the dimensions, materials, shapes, relative arrangements, and others of components described in the embodiments are not intended to limit the scope of the present invention only to them unless otherwise described explicitly.

First Embodiment

With reference to FIG. 1 to FIG. 4, a sealing member according to the present invention will be described. In addition, in the present embodiment, a side seal for sealing between a side surface of a rotor for a rotary engine and a side housing will be described as an example of the sealing member according to the present invention.

Figure 1:
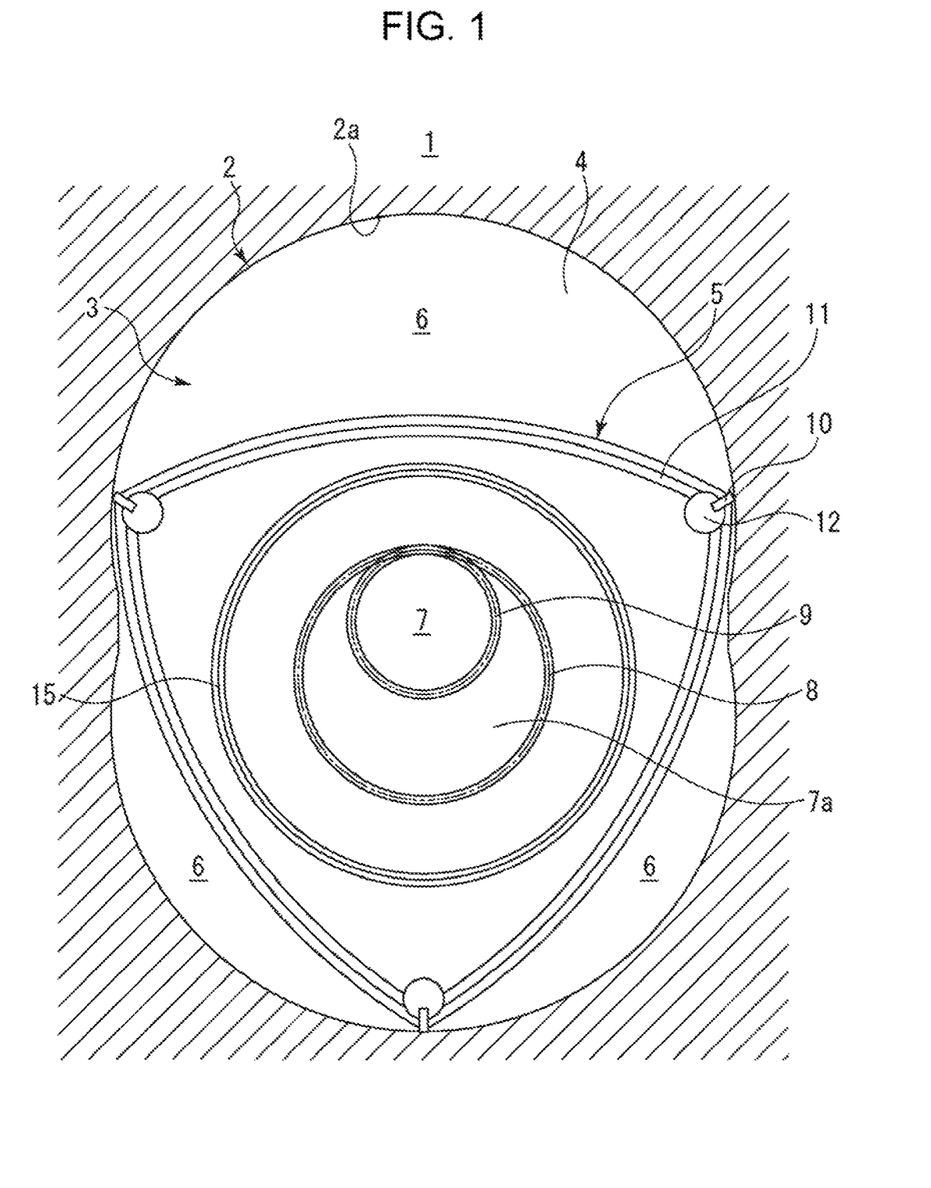
FIG. 1 is a vertical cross-sectional view showing a rotating body including a sealing member according to the present invention, and rotating while whirling within an accommodating chamber.

In FIG. 1, a rotary engine 1 includes a housing consisting of a rotor housing 2 having a two-node peritrochoid-curved inner circumferential wall 2a and a pair of side housings 3 (side walls of the present invention) sandwiching the rotor housing 2 from both sides in an axial direction, and a rotor 5 (a rotating body of the present invention) accommodated in an accommodating chamber 4 partitioned by the rotor housing 2 and the side housings 3 and having a triangular shape, and further includes three operation chambers 6 partitioned by an outer circumferential wall of the rotor 5 and the trochoidal inner circumferential wall 2a.

Moreover, an eccentric shaft 7 is provided to pass through almost the center of the pair of side housings 3, and the rotor 5 is fitted into an eccentric wheel 7a of the eccentric shaft 7 and is rotatably supported eccentrically with respect to a shaft center of the eccentric shaft 7. Moreover, an internal gear 8 provided on an inner side of the rotor 5 is meshed with a fixed gear 9 provided on the side housing 3 side, and thereby the rotor 5 revolves around the eccentric shaft 7 while rotating. Thereby, the capacity of the operation chamber 6 increases and decreases with rotation of the rotor 5.

The triangular rotor 5 is provided with apex seals 10 attached to respective apexes thereof for keeping air tightness of the three operation chambers 6 while sliding on the inner circumferential wall 2a, side seals 11 (sealing members according to the present invention) attached to respective sides of side surfaces of the triangular rotor 5 for keeping air tightness between the rotor 5 and the side housing 3, and corner seals 12 attached to connecting points of the apex seal 10 and the side seal 11 for keeping air tightness of the operation chambers 6 and the side housings 3. Moreover, on an inner diameter side of the rotor 5, an oil seal 15 for preventing cooling oil for cooling an interior space of the rotor 5 from leaking to the operation chambers 6 is provided. These various seals are sliding on the rotor housing and the side housings while sealing between the rotor and the both rotor housing and side housings. In addition, to the interior space of the rotor 5, the cooling oil for cooling the rotor 5 from the interior is supplied, and by a part of the cooling oil, the apex seals 10, the side seals 11, and the corner seals 12 are lubricated.

Among the apex seal 10, the side seal 11, the corner seal 12, and the oil seal 15, the side seal 11 has a large contact area with the side housing 3 because of being attached to the side surfaces of the respective sides of the triangular rotor along almost overall length and further has large sliding velocity because of being attached to the outer circumferential side of the rotor, and therefore sliding loss increases. Moreover, even if a lubrication groove is provided in a sliding surface of the side seal 11 in order to reduce sliding loss of the side seal 11, the rotor 5 rotating while whirling could not sufficiently take fluid in the lubrication groove because the sliding direction of the side seal 11 and the side housing 3 is changed during one revolution, and sliding loss could not be reduced.

Figure 2:
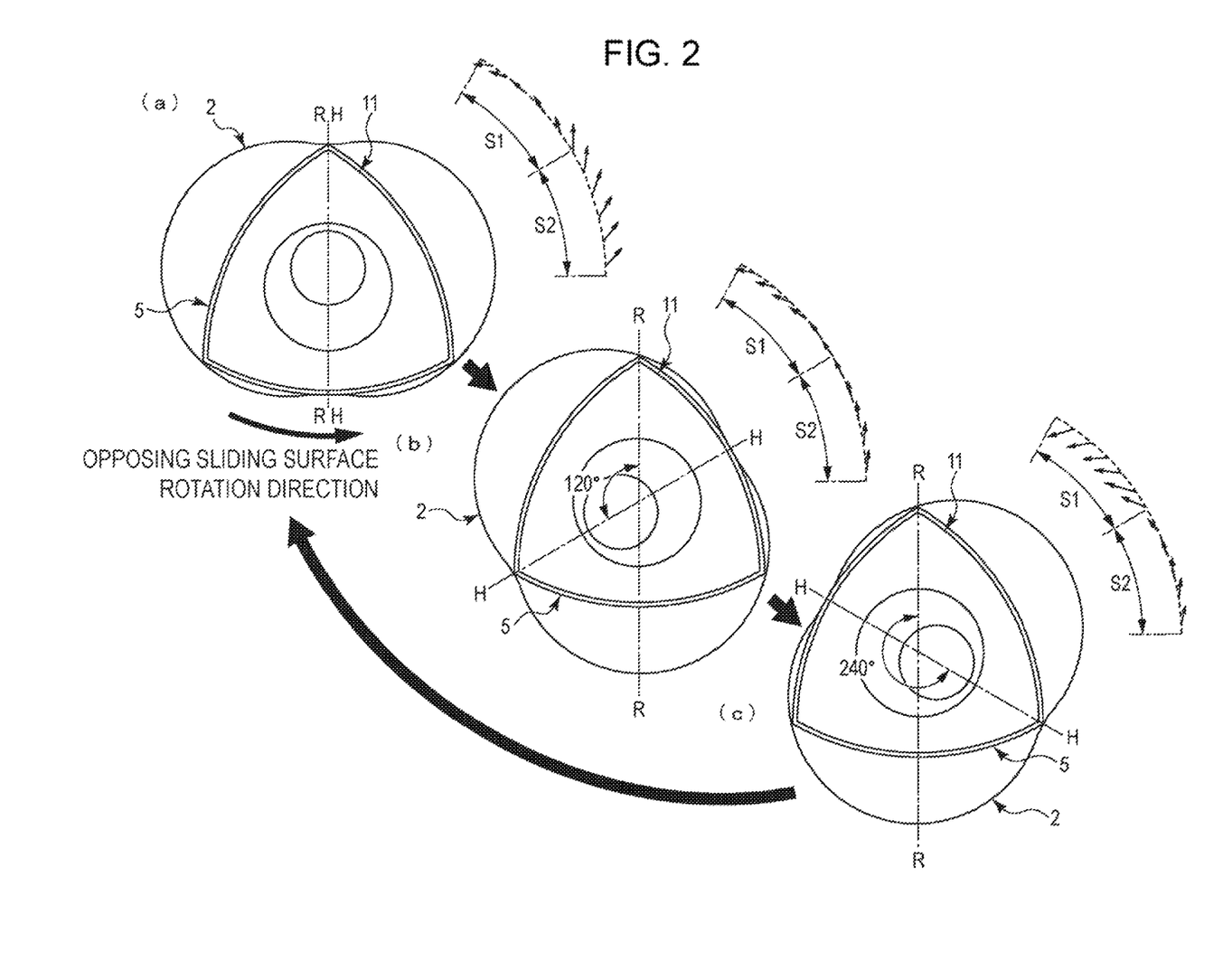
FIG. 2 is a drawing showing velocity distribution of a sliding surface of the sealing member during one revolution of the rotating body rotating while whirling within the accommodating chamber.

FIG. 2 shows sliding velocity of a sliding surface S of the side seal 11 along the longitudinal direction. In order to show the change of sliding velocity of one of the side seals 11 during one revolution of the rotor 5, FIG. 2 shows a distribution of sliding velocity of the sliding surface when the rotor 5 is fixed and the rotor housing 2 and the side housing 3 are rotated once in a counterclockwise direction instead of rotation of the rotor 5. Moreover, an upper side s1 from the center part of the sliding surface indicates a delay side in a rotation direction of the rotor (hereinafter, referred to as "a delay side s1 in the rotation direction"), and a lower side s2 from the center part of the sliding surface indicates an advancing side in the rotation direction of the rotor (hereinafter, referred to as "an advancing side s2 in the rotation direction"). In addition, FIG. 2 shows the case where the rotor 5 is fixed and the rotor housing 2 and the side housing 3 are rotated in a counterclockwise direction, and if, on the other hand, the rotor housing 2 and the side housing 3 are fixed, the rotation direction of the rotor 5 is a clockwise direction.

FIG. 2A shows a distribution of sliding velocity of the sliding surface S of the side seal 11 in a position where a short axis H-H of the rotor housing 2 and an axis R-R passing through the apex seal 10 of the rotor 5 and the center of the rotor 5 coincide. As to a sliding velocity Vs1 of the sliding surface in FIG. 2A, the sliding velocity on the advancing side s2 in the rotation direction nearer the delay side s1 in the rotation direction is large, and as to the direction of the sliding velocity on the advancing side s2 in the rotation direction, the velocity in the direction toward an outer diameter side from the inner diameter side of the sliding surface is dominant. On the other hand, the sliding velocity on the delay side s1 in the rotation direction is small, and the direction of the sliding velocity is a direction along the longitudinal direction of the sliding surface.

FIG. 2B shows a distribution of the sliding velocity of the sliding surface S of the side seal 11 in a position where the rotor housing 2 is rotated 120° in a counterclockwise direction from the position of FIG. 2A. A sliding velocity Vs2 of the sliding surface in FIG. 2B indicates a velocity approximately equal along overall length of the sliding surface, and the direction of the sliding velocity has a direction along almost the longitudinal direction of the sliding surface.

FIG. 2C shows a distribution of the sliding velocity of the sliding surface S of the side seal 11 in a position where the rotor housing 2 is rotated 240° in a counterclockwise direction from the position of FIG. 2A. As to a sliding velocity Vs3 of the sliding surface in FIG. 2C, the sliding velocity on the delay side s1 in the rotation direction nearer the advancing side s2 in the rotation direction is large, and as to the direction of the sliding velocity on the delay side s1 in the rotation direction, the velocity in the direction toward the inner diameter side from the outer diameter side of the sliding surface is dominant. On the other hand, the sliding velocity on the advancing side s2 in the rotation direction is small, and the direction of the sliding velocity is a direction along almost the longitudinal direction of the sliding surface S.

As described above, as to the sliding velocity of the sliding surface S of the side seal 11 during one revolution of the rotor 5, on the advancing side s2 in the rotation direction, the velocity in the direction toward the outer diameter side from the inner diameter side of the sliding surface S is dominant regardless of rotational position, and on the other hand, on the delay side s1 in the rotation direction, the velocity in the direction toward the inner diameter side from the outer diameter side of the sliding surface S is dominant regardless of the rotational position. Thus, on the sliding surface S of the side seal 11 of the present invention, lubrication mechanisms are provided in accordance with the direction of the sliding velocity of the sliding surface S, thereby improving sliding property.

Figure 3:
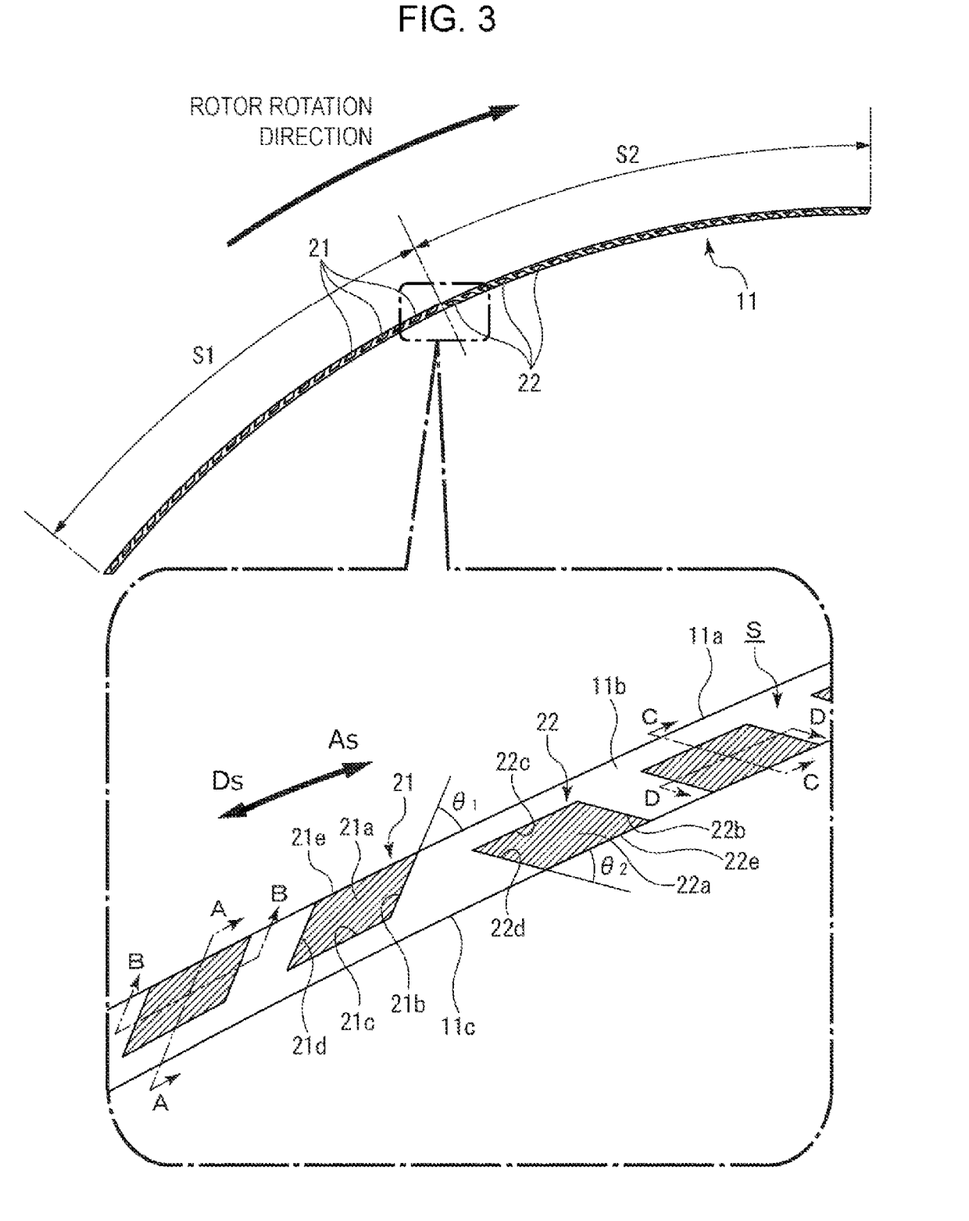
FIG. 3 is a drawing showing lubrication mechanisms provided on the sliding surface of the sealing member according to a first embodiment.
Figure 4:
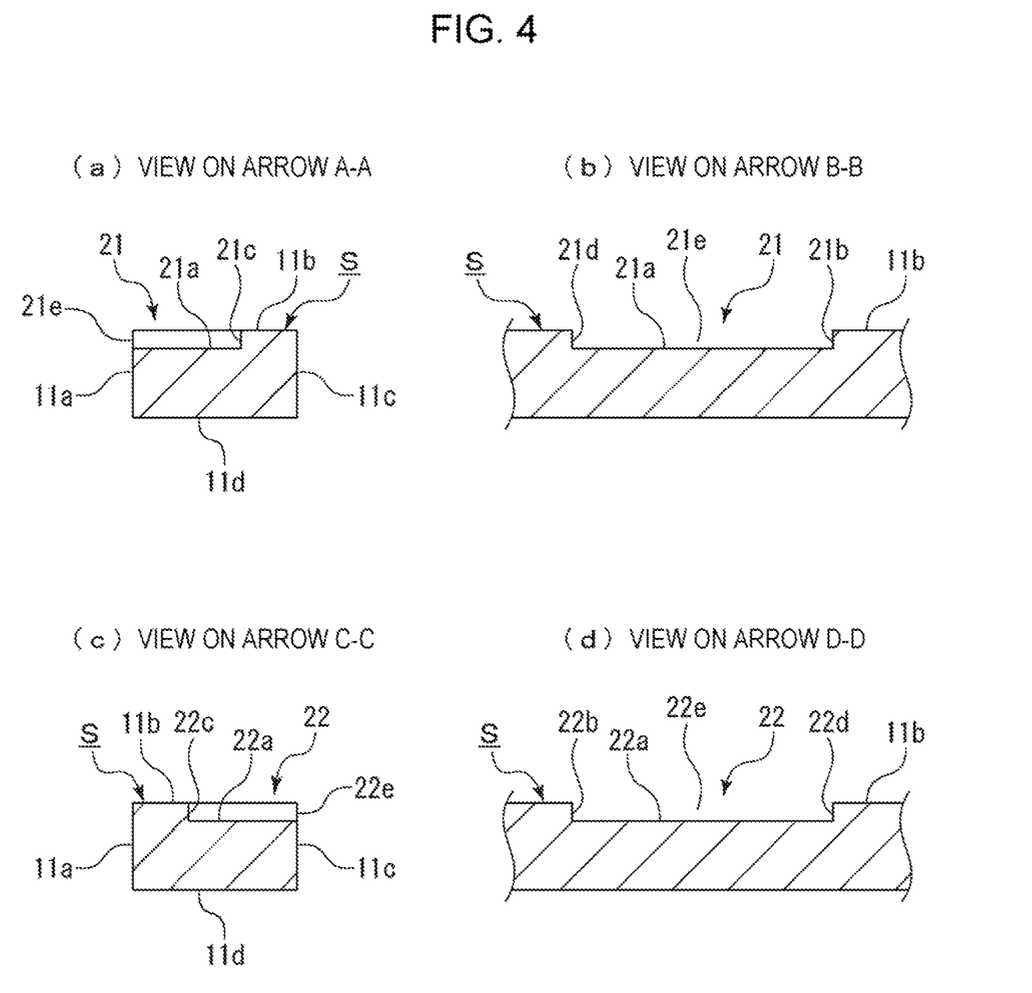
FIG. 4A is a view on arrow A-A in FIG. 3.
FIG. 4B is a view on arrow B-B in FIG. 3.
FIG. 4C is a view on arrow C-C in FIG. 3.
FIG. 4D is a view on arrow D-D in FIG. 3.

Hereinafter, the side seal 11 with a first lubrication mechanism 21 and a second lubrication mechanism 22 on the sliding surface S will be described. As shown in FIG. 3 and FIG. 4, the side seal 11 has a rectangular cross-sectional shape consisting of wall parts 11a, 11b, 11c and 11d, and is a rod-like member having an arch shape in a plan view. The side seal 11 is fitted into a groove part, which is shallower than the thickness of the side seal 11, of the rotor 5, thereby sealing between the side seal 11 and the rotor 5. Moreover, the wall part 11b of the side seal 11 functions as the sliding surface S, and the sliding surface S includes a plurality of the first lubrication mechanisms 21 having an opening part 21e opened in a radial direction on the delay side s1 in the rotation direction from the center part in the longitudinal direction, and includes a plurality of the second lubrication mechanisms 22 having an opening part 22e opened in a direction opposite to the first lubrication mechanism 21 on the advancing side s2 in the rotation direction from the center part in the longitudinal direction.

As shown in FIG. 3 and FIG. 4, the first lubrication mechanism 21 is formed of a recess having a bottom part 21a having a diamond shape in a plan view, and has closing wall parts 21b, 21c and 21d closing the recess, and the opening part 21e opening an outer side in the radial direction of the recess. Similarly, the second lubrication mechanism 22 is formed of a recess having a bottom part 22a having a diamond shape in a plan view, and has closing wall parts 22b, 22c and 22d closing the recess, and the opening part 22e opening an inner side in the radial direction of the recess in a direction opposite to the opening part 21e. In addition, the depth of the recess is formed to be around 1 µm to 100 µm.

As shown in FIG. 2, as to the sliding velocity on the delay side s1 in the rotation direction from the center part of the sliding surface S of the side seal 11, the velocity in the direction toward the inner side from the outer side in the radial direction is dominant. Thus, as shown in FIG. 3, by arranging the first lubrication mechanism 21 having the opening part 21e on the outer diameter side in accordance with the direction of the sliding velocity, the fluid efficiently flows into the first lubrication mechanism 21 from the opening part 21e, the flowed fluid is blocked by the closing wall parts 21b, 21c and 21d and its pressure is raised, the fluid with pressure raised is supplied to the sliding surface S, and the sliding surface S is lubricated. On the other hand, as to the sliding velocity on the advancing side s2 from the center part of the sliding surface S of the side seal 11, the velocity in the direction toward the outer side from the inner side in the radial direction is dominant. Thus, by arranging the second lubrication mechanism 22 having the opening part 22e on the inner diameter side in accordance with the direction of the sliding velocity, the fluid efficiently flows into the second lubrication mechanism 22 from the opening part 22e, the flowed fluid is blocked by the closing wall parts 22b, 22c and 22d and its pressure is raised, the fluid with pressure raised is supplied to the sliding surface S, and the sliding surface S is lubricated.

Moreover, the closing wall parts 21b and 21d of the first lubrication mechanism 21 are inclined at an angle θ1 so as to be disposed on the delay side (Ds) in the rotation direction with respect to the opening part 21e disposed on the advancing side (As). Similarly, the closing wall parts 22b and 22d of the second lubrication mechanism 22 are inclined at an angle θ2 so as to be disposed on the delay side (Ds) in the rotation direction with respect to the opening part 22e disposed on the advancing side (As). In addition, the angle θ1 and the angle θ2 are determined based on the magnitudes of a radial component and a circumferential component of the sliding velocity of the sliding surface. Thereby, as compared to a case of not being inclined, the fluid flows into the first lubrication mechanism 21 and the second lubrication mechanism 22 with low loss, the fluid with pressure raised within the first lubrication mechanism 21 and the second lubrication mechanism 22 is supplied to the sliding surface S, and the sliding surface S is efficiently lubricated, and therefore, sliding friction of the side housing 3 and the side seal 11 is reduced and abrasion of the side housing 3 and the side seal 11 is reduced, and thereby sealing performance of the side seal 11 can be improved.

As described above, even if the magnitude and direction of the sliding velocity on the sliding surface S of the side seal 11 provided to the rotor 5 rotating while whirling are changed, by including a group of the first lubrication mechanism 21 and the second lubrication mechanism 22 having the opening parts 21e and 22e respectively opened to the outer side and the inner side in the radial direction on the advancing side and delay side in the rotation direction from the center part in the longitudinal direction of the sliding surface S of the side seal 11, the fluid efficiently flows into the first lubrication mechanism 21 and the second lubrication mechanism 22 from the opening parts 21e and 22e, the fluid with pressure raised within the first lubrication mechanism 21 and the second lubrication mechanism 22 is supplied to the sliding surface S, and the sliding surface S is efficiently lubricated, and therefore, sliding friction of the side housing 3 and the side seal 11 is reduced and abrasion of the side housing 3 and the side seal 11 is reduced, and thereby sealing performance of the side seal 11 can be improved.

Hereinbefore, the embodiment of the present invention has been described with reference to the drawings, but the specific configuration is not limited to the embodiment. The present invention also includes any changes or additions made within a scope that does not depart from the spirit of the present invention.

For example, in the above embodiment, the recess is formed in an inclined rectangular shape in a plan view, but is not limited thereto, and the recess may be formed in an elliptical shape or an inclined elliptical shape in a plan view.

Moreover, the bottom parts 21a and 22a of the first lubrication mechanism 21 and the second lubrication mechanism 22 are formed as a flat surface, but are not limited thereto. For example, the bottom parts 21a and 22a may be an inclined surface inclined upward toward the closing wall parts 21c and 22c from the opening parts 21e and 22e. Thereby, pressure of the fluid can be further raised within the first lubrication mechanism 21 and the second lubrication mechanism 22, and therefore, even if a fluid lubrication film is hardly formed in a high temperature condition, sliding loss can be reduced by maintaining a lubricated condition of the sliding surface, and sealing performance can be improved by reducing abrasion.

Moreover, in the above embodiment, the longitudinal length of the center part of the sliding surface S is illustrated as being zero. However, the longitudinal length of the center part is not limited to zero. For example, in the above embodiment, on the delay side s1 in the rotation direction and the advancing side s2 in the rotation direction from the center part of the sliding surface S, the direction of the dominant sliding velocity can be set to almost one direction regardless of the rotational position of the rotor. However, the direction of the sliding velocity at the center part of the sliding surface S is varied depending on the rotational position of the rotor, and there is a case where the direction of the dominant sliding velocity cannot be set to one direction. In this case, a third lubrication mechanism in which the first lubrication mechanism opened to the outer diameter side and the second lubrication mechanism opened to the inner diameter side are provided in parallel or alternately in the center part may be provided. Then, by providing the first lubrication mechanism having a first opening part on one side from the center part with the third lubrication mechanism and providing the second lubrication mechanism having a second opening part on the other side from the center part, the case where the sliding direction is varied can be dealt with.

Moreover, in the above embodiment, the longitudinal length on the advancing side s2 in the rotation direction and the longitudinal length on the delay side s1 in the rotation direction are illustrated as being approximately equal, but are not limited thereto. For example, in accordance with the velocity distribution of the sliding surface, the longitudinal length on the advancing side s2 in the rotation direction may be longer or shorter than the longitudinal length on the delay side s1 on the rotation direction.

Moreover, in the example described in the above embodiment, on the advancing side s2 in the rotation direction, the velocity in the direction toward the outer diameter side from the inner diameter side of the sliding surface S is dominant, and on the delay side s1 in the rotation direction, the velocity in the direction toward the inner diameter side from the outer diameter side of the sliding surface S is dominant. However, depending on a combination, which is different from the embodiment, of the whirling direction of the rotating body and the rotation direction of the rotating body, on the advancing side s2 in the rotation direction, the velocity in the direction toward the inner diameter side from the outer diameter side of the sliding surface S may be dominant, and on the delay side s1 in the rotation direction, the velocity in the direction toward the outer diameter side from the inner diameter side of the sliding surface S may be dominant. Therefore, it goes without saying that, in accordance with the direction of the sliding velocity, the magnitude of the sliding velocity, and the distribution condition of the sliding velocity of the sliding surface S of the side seal 11, the first lubrication mechanism opened to the outer diameter side and the second lubrication mechanism opened to the inner diameter side are provided.

Second Embodiment

Next, the sealing member according to a second embodiment will be described with reference to FIG. 5 and FIG. 6. The side seal 11 according to the second embodiment is different from the first embodiment in that the opening direction of the first lubrication mechanism and the opening direction of the second lubrication mechanism are respectively reversed to that of the first embodiment. In addition, the overlapping configurations same as that of the above embodiment are denoted by the same reference numerals, and the descriptions thereof will be omitted.

The side seal 11 according to the second embodiment includes a first lubrication mechanism 31 arranged on the delay side s1 in the rotation direction from the center part in the longitudinal direction of the side seal 11, and a second lubrication mechanism 32 arranged on the advancing side s2 in the rotation direction from the center part in the longitudinal direction of the side seal 11, and the first lubrication mechanism 31 has an opening part 31e opened to the inner side in the radial direction and the second lubrication mechanism 32 has an opening part 32e opened to the outer side in the radial direction. That is, the opening direction of the opening part 31e of the first lubrication mechanism 31 and the opening direction of the opening part 32e of the second lubrication mechanism 32 are opposite to each other.

Figure 5:
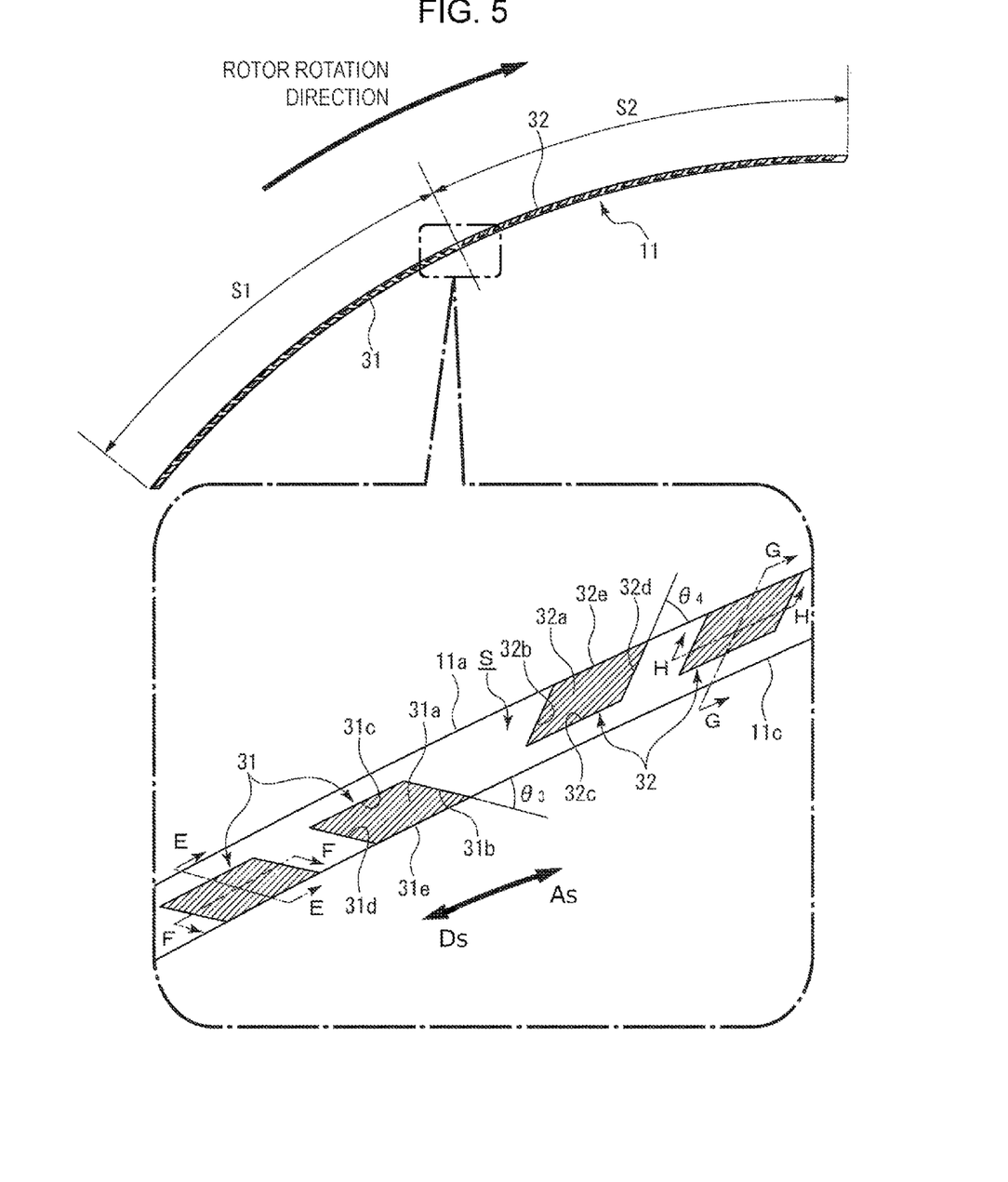
FIG. 5 is a drawing showing the lubrication mechanisms provided on the sliding surface of the sealing member according to a second embodiment.
Figure 6:
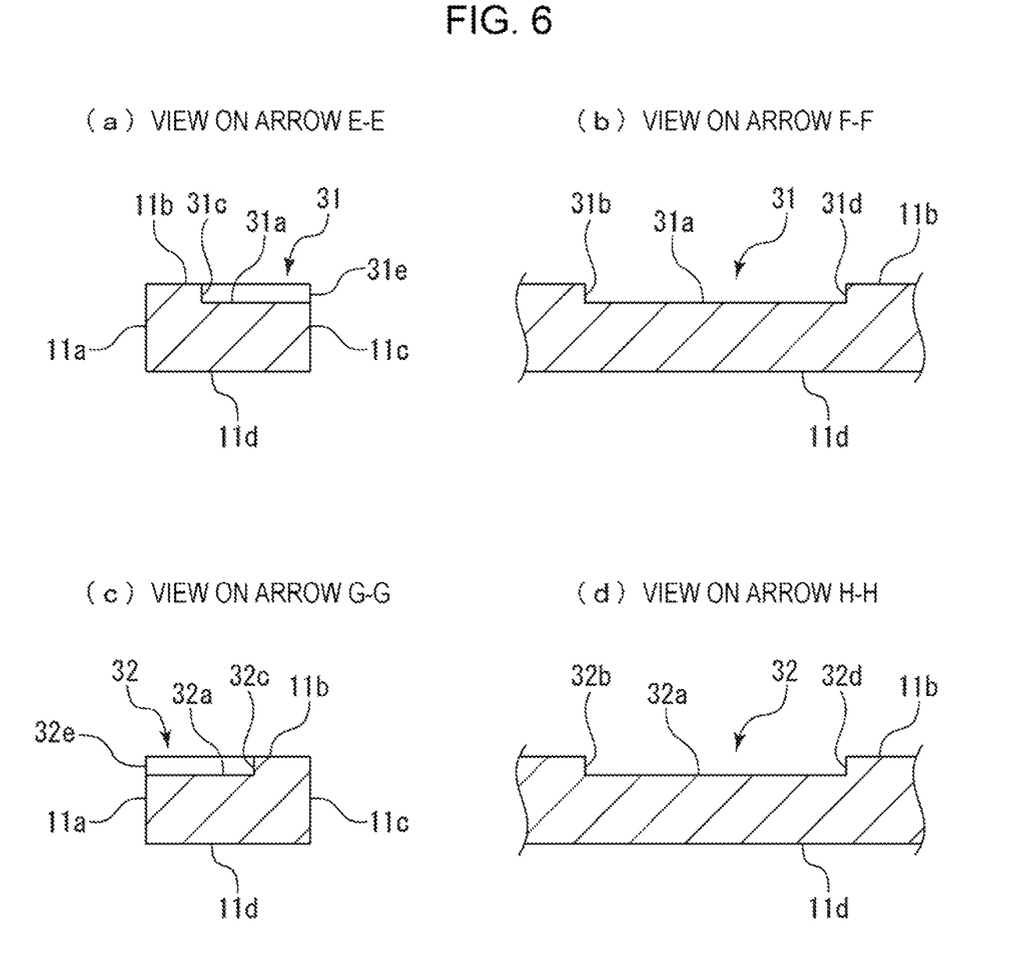
FIG. 6A is a view on arrow E-E in FIG. 5.
FIG. 6B is a view on arrow F-F in FIG. 5.
FIG. 6C is a view on arrow G-G in FIG. 5.
FIG. 6D is a view on arrow H-H in FIG. 5.

As shown in FIG. 5 and FIG. 6, the first lubrication mechanism 31 is formed of a recess having a bottom part 31a having a diamond shape in a plan view, and has closing wall parts 31b, 31c and 31d closing a periphery of the recess, and the opening part 31e opening the inner side in the radial direction of the recess. Similarly, the second lubrication mechanism 32 is formed of a recess having a bottom part 32a having a diamond shape in a plan view, and has closing wall parts 32b, 32c and 32d closing a periphery of the recess, and the opening part 32e opening the recess to the outer side in the radial direction. Moreover, the closing wall parts 31b and 31d of the first lubrication mechanism 31 are inclined at an angle θ3 so as to be disposed on the delay side (Ds) in the rotation direction with respect to the opening part 31e disposed on the advancing side (As). Similarly, the closing wall parts 32b and 32d of the second lubrication mechanism 32 are inclined at an angle θ4 so as to be disposed on the delay side (Ds) in the rotation direction with respect to the opening part 32e disposed on the advancing side (As). In addition, the depth of the recess is formed to be around 1 μm to 100 μm.

As described in FIG. 2, as to the sliding velocity on the delay side s1 in the rotation direction from the center part of the sliding surface S of the side seal 11, the velocity in the direction toward the inner side from the outer side in the radial direction is dominant, and on the other hand, as to the sliding velocity on the advancing side s2 from the center part of the sliding surface S of the side seal 11, the velocity in the direction toward the outer side from the inner side in the radial direction is dominant. Since the opening part 31e of the first lubrication mechanism 31 of the second embodiment is opened to the inner side in the radial direction and the opening part 32e of the second lubrication mechanism 32 is opened to the outer side in the radial direction, the fluid cannot be efficiently taken in the first lubrication mechanism 31 and the second lubrication mechanism 32 by using the sliding velocity directly. However, as to the side seal 11 of the second embodiment, the fluid (oil) scraped by the outer wall part 11a and the inner wall part 11c of the side seal 11 is carried within the first lubrication mechanism 31 and the second lubrication mechanism 32 by rotation of the rotor 5, and the first lubrication mechanism 31 and the second lubrication mechanism 32 can keep the sliding surface S of the side seal 11 in a lubricated condition. Hereinafter, the operation and effect of the side seal 11 of the second embodiment will be described with reference to FIG. 2, FIG. 5 and FIG. 6.

In FIG. 2A, as to the sliding velocity Vs1 of the sliding surface S of the side seal 11, the velocity toward the outer side in the radial direction is dominant. Thereby, the fluid (oil) on a wall surface of the side housing 3 is mainly scraped by the inner wall part 11c of the side seal 11. Then, in the process that the rotor 5 is rotated from the state of FIG. 2A to the state of FIG. 2B, the scraped fluid flows along the wall part 11c of the side seal 11, flows into the first lubrication mechanism 31 from the opening part 31e of the first lubrication mechanism 31, and the fluid is supplied to the sliding surface S of the side seal 11 from the interior of the first lubrication mechanism 31, thereby the sliding surface S of the side seal 11 can keep a fluid lubrication condition.

Moreover, in a step shown in FIG. 2B, a compressed fuel explodes. At the time of explosion, the sliding surface S of the side seal 11 floats above the side housing 3, and the scraped fluid is supplied to almost whole surface of the sliding surface S of the side seal 11, thereby the sliding surface S of the side seal 11 can keep the fluid lubrication condition.

Next, in FIG. 2C, as to the sliding velocity Vs1 of the sliding surface S of the side seal 11, the velocity in the direction toward the inner side in the radial direction from the outer side in the radial direction is dominant. Thereby, the fluid on the wall surface of the side housing 3 is mainly scraped by the outer wall part 11a of the side seal 11. Then, in the process that the rotor 5 is rotated from the state of FIG. 2C to the state of FIG. 2A, the scraped fluid flows into the second lubrication mechanism 32 from the opening part 32e of the second lubrication mechanism 32 of the side seal 11 along the wall part 11a of the side seal 11, and the fluid is supplied to the sliding surface S of the side seal 11 from the interior of the second lubrication mechanism 32, thereby the sliding surface S of the side seal 11 can keep the fluid lubrication condition.

Since a volume of fluid scraped by the side seal 11 is large, a fluid volume required for lubricating the sliding surface S of the side seal 11 can be sufficiently supplied. Then, the fluid scraped by the side seal 11 is sufficiently supplied into the first lubrication mechanism 31 and the second lubrication mechanism 32 by rotation of the rotor 5, the first lubrication mechanism 31 and the second lubrication mechanism 32 can keep the sliding surface S of the side seal 11 in a lubricated condition, and thus, sliding friction of the side housing 3 and the side seal 11 is reduced and abrasion of the side housing 3 and the side seal 11 is reduced, and thereby sealing performance of the side seal 11 can be improved.

Hereinbefore, the embodiments of the present invention have been described with reference to the drawings, but the specific configuration is not limited to the embodiments. The present invention also includes any changes or additions made within a scope that does not depart from the spirit of the present invention.

In the above embodiments, the side seal has been described as being used for a rotor of a rotary engine, but is not limited to the rotary engine, and the side seal may be used for a rotary compressor.

REFERENCE SIGNS LIST 1 rotary engine
2 rotor housing
2a inner circumferential wall
3 side housing (side wall)
4 accommodating chamber
5 rotor (rotating body)
6 operation chamber
7 eccentric shaft
8 internal gear
9 fixed gear
10 apex seal
11 side seal (sealing member)
11a wall part
11b wall part (sealing surface S)
11c wall part
11d wall part
21 first lubrication mechanism
21a bottom part
21b closing wall part 21c closing wall part
21d closing wall part
21e opening part
22 second lubrication mechanism
22a bottom part
22b closing wall part
22c closing wall part
22d closing wall part
22e opening part
31 first lubrication mechanism
31a bottom part
31b closing wall part
31c closing wall part
31d closing wall part
31e opening part
32 second lubrication mechanism
32a bottom part
32b closing wall part
32c closing wall part
32d closing wall part
32e opening part
S sliding surface

The invention claimed is:

1. A sealing member provided between a rotating body rotating while whirling within an accommodating chamber partitioned by a housing and a side wall of the housing and having a sliding surface sliding on the side wall, wherein:
the sliding surface is constituted by longitudinal sliding sections, each longitudinal sliding section having a delay side, which is an upstream side, and an advancing side, which is a downstream side, in a longitudinal direction with respect to a sliding direction, wherein a first lubrication mechanism is arranged solely on the delay side, and a second lubrication mechanism is arranged solely on the advancing side,
the first lubrication mechanism and the second lubrication mechanism are each constituted by and comprised of a recess,
the recess of the first lubrication mechanism has closing wall parts closing the recess and an opening part solely open to one side of the longitudinal sliding section in a radial direction with respect to a rotation center,
the recess of the second lubrication mechanism has closing wall parts closing the recess and an opening part solely open to an other side the longitudinal sliding section in the radial direction with respect to the rotation center.

2. The sealing member according to claim 1, wherein the opening part of the first lubrication mechanism is a first opening part open to an outer side of the longitudinal sliding section in the radial direction with respect to the rotation center, and the opening part of the second lubrication mechanism is a second opening part open to an inner side of the longitudinal sliding section in the radial direction with respect to the rotation center.

3. The sealing member according to claim 1, wherein the opening part of the first lubrication mechanism is a first opening part open to an inner side of the longitudinal sliding section in the radial direction with respect to the rotation center, and the opening part of the second lubrication mechanism is a second opening part open to an outer side of the longitudinal sliding section in the radial direction with respect to the rotation center.

4. The sealing member according to claim 2, wherein the recess of the first lubrication mechanism has a delay side, which is an upstream side, and an advancing side, which is a downstream side, with respect to the sliding direction, and the recess of the second lubrication mechanism has a delay side, which is an upstream side, and an advancing side, which is a downstream side, with respect to the sliding direction,
wherein the closing wall parts of the recesses of the first lubrication mechanism and the second lubrication mechanism, respectively, extend to the delay side upstream of the corresponding opening parts with respect to the sliding direction.

5. The sealing member according to claim 1, characterized in that the sliding surface includes a plurality of the first lubrication mechanisms and a plurality of the second lubrication mechanisms.

6. The sealing member according to claim 1, characterized in that the first lubrication mechanism and the second lubrication mechanism are formed of a diamond shaped recess.

7. The sealing member according to claim 3, wherein the recess of the first lubrication mechanism has a delay side, which is an upstream side, and an advancing side, which is a downstream side, with respect to the sliding direction, and the recess of the second lubrication mechanism has a delay side, which is an upstream side, and an advancing side, which is a downstream side, with respect to the sliding direction,
wherein the closing wall parts of the recesses of the first lubrication mechanism and the second lubrication mechanism, respectively, extend to the delay side upstream of the corresponding opening parts with respect to the sliding direction.

8. The sealing member according to claim 2, characterized in that the sliding surface includes a plurality of the first lubrication mechanisms and a plurality of the second lubrication mechanisms.

9. The sealing member according to claim 3, characterized in that the sliding surface includes a plurality of the first lubrication mechanisms and a plurality of the second lubrication mechanisms.

10. The sealing member according to claim 4, characterized in that the sliding surface includes a plurality of the first lubrication mechanisms and a plurality of the second lubrication mechanisms.

11. The sealing member according to claim 7, characterized in that the sliding surface includes a plurality of the first lubrication mechanisms and a plurality of the second lubrication mechanisms.

12. The sealing member according to claim 2, characterized in that the first lubrication mechanism and the second lubrication mechanism are formed of a diamond shaped recess.

13. The sealing member according to claim 3, characterized in that the first lubrication mechanism and the second lubrication mechanism are formed of a diamond shaped recess.

14. The sealing member according to claim 4, characterized in that the first lubrication mechanism and the second lubrication mechanism are formed of a diamond shaped recess.

15. The sealing member according to claim 5, characterized in that the first lubrication mechanism and the second lubrication mechanism are formed of a diamond shaped recess.

16. The sealing member according to claim 7, characterized in that the first lubrication mechanism and the second lubrication mechanism are formed of a diamond shaped recess.

17. The sealing member according to claim 8, characterized in that the first lubrication mechanism and the second lubrication mechanism are formed of a diamond shaped recess.

18. The sealing member according to claim 9, characterized in that the first lubrication mechanism and the second lubrication mechanism are formed of a diamond shaped recess.

19. The sealing member according to claim 10, characterized in that the first lubrication mechanism and the second lubrication mechanism are formed of a diamond shaped recess.

20. The sealing member according to claim 11, characterized in that the first lubrication mechanism and the second lubrication mechanism are formed of a diamond shaped recess.

* * * * *